United States Patent [19]
Morikawa et al.

[11] Patent Number: 5,281,120
[45] Date of Patent: Jan. 25, 1994

[54] APPARATUS FOR PRODUCING CROISSANTS WITH FILLINGS

[75] Inventors: Michio Morikawa; Sadao Ueno, both of Utsunomiya, Japan

[73] Assignee: Rheon Automatic Machinery Co., Ltd., Tochigi, Japan

[21] Appl. No.: 381

[22] Filed: Jan. 4, 1993

[30] Foreign Application Priority Data

Jan. 6, 1992 [JP] Japan .................................. 4-18285

[51] Int. Cl.⁵ .................. A21C 3/06; B29C 53/32
[52] U.S. Cl. ........................ 425/115; 425/321; 425/334; 425/371; 426/501; 426/502; 426/512; 99/450.2; 99/450.6
[58] Field of Search ............. 425/320, 321, 334, 371, 425/115; 426/500, 512, 501, 502; 99/450.2, 450.6

[56] References Cited

U.S. PATENT DOCUMENTS

| 3,946,656 | 3/1976 | Hai | 99/450.6 |
| 4,014,254 | 3/1977 | Ohkawa | 99/450.6 |
| 4,313,719 | 2/1982 | Lundgren | 99/450.6 |
| 4,996,915 | 3/1991 | Morikawa et al. | 425/321 |
| 5,018,439 | 5/1991 | Bordin | 425/321 |
| 5,085,138 | 2/1992 | Fehr et al. | 99/450.6 |

FOREIGN PATENT DOCUMENTS

677652 8/1952 United Kingdom ............ 425/321

*Primary Examiner*—Khanh Nguyen

[57] ABSTRACT

An apparatus for producing croissants with fillings includes a filling-depositing stage for depositing a filling on a croissant dough piece that is being conveyed in a downstream direction, a rolling-up preparation stage positioned downstream of the filling-depositing stage for raising the croissant dough piece at its leading edge and simultaneously turning the leading edge backward to be folded in the upstream direction to thereby cover the filling, and a rolling-up stage positioned downstream of the rolling-up preparation stage for rolling up the croissant dough piece.

3 Claims, 4 Drawing Sheets

APPARATUS FOR PRODUCING CROISSANTS WITH FILLINGS

BACKGROUND OF THE INVENTION

1. Field of the Invention

The present invention relates to an apparatus for producing croissants, and especially croissants with a filling of jam, cream, or the like.

2. Description of Prior Art

Croissants are conventionally produced by cutting triangular pieces from a sheet of croissant dough, putting a filling on the pieces, and rolling them up from the base of the triangular sheet, usually by causing dough pieces to progress between a conveyor and a net positioned above it.

When rolling up dough pieces by this conventional means, the filling tends to be exposed because the dough piece is not always properly rolled up at the first stage of the rolling-up operation. Also, the exposed filling sticks to the rolling-up belts or nets, making it impossible to continuously produce croissants.

SUMMARY OF THIS INVENTION

This invention intends to solve the problems mentioned above by depositing the fillings on dough pieces and rolling up the pieces while the filling is prevented from being exposed, thereby eliminating any filling sticking to the rolling-up belts, and making continuous production possible.

The present invention provides an apparatus for producing croissants with fillings characterized in that it comprises:

a filling-depositing means to deposit a filling on a croissant dough piece which is being conveyed;

a rolling-up preparation means having a plurality of conveyor belt means positioned downstream of the filling-depositing means, the conveyor belt means including a plurality of conveyor belts spaced apart from and parallel to each other at preset distances to form a conveying surface, the rolling-up preparation means further provided with a plurality of cantilevered small endless belts spaced apart from and parallel to each other at preset distances, a part of the small endless belts in their longitudinal direction being adapted to intersect at preset times the spaces defined by the conveyor belts at a preset angle; and a rolling-up means positioned downstream of the rolling-up preparation means.

DESCRIPTION OF A PREFERRED EMBODIMENT

An embodiment of the invention will now be explained by reference to the accompanying drawings.

Figure 1:
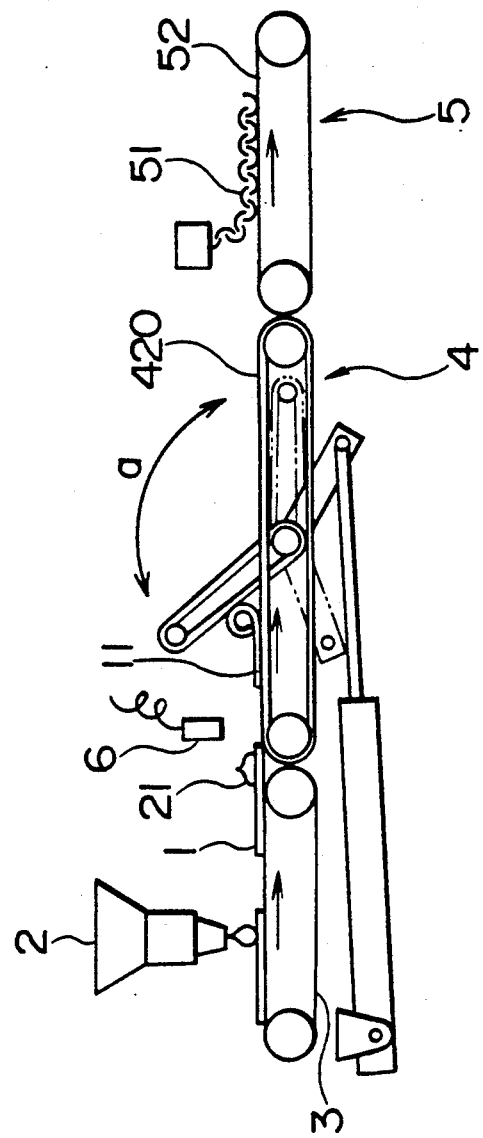
FIG. 1 is an overall schematic side view of an embodiment of the present invention.

In FIG. 1, a triangular croissant dough piece 1 is transported with the base of the triangular piece placed forward and perpendicular to the direction of movement.

A filling or depositing means 2 is provided to place a jam filling 21 on the dough piece 1, which is moved under the depositing means by any known drive means. In FIG. 1 a conveyor 3 for the dough piece 1 is shown as means for supporting the dough piece while it receives the filling. When the dough piece receives a filling, the conveyor 3 transports the dough piece to a rolling-up preparation means 4. A rolling-up means 5 is positioned downstream of the rolling-up preparation means 4. A dough detector 6 is positioned above the upstream end of the rolling-up preparation means. The detector detects the feeding of the dough piece.

Figure 2:
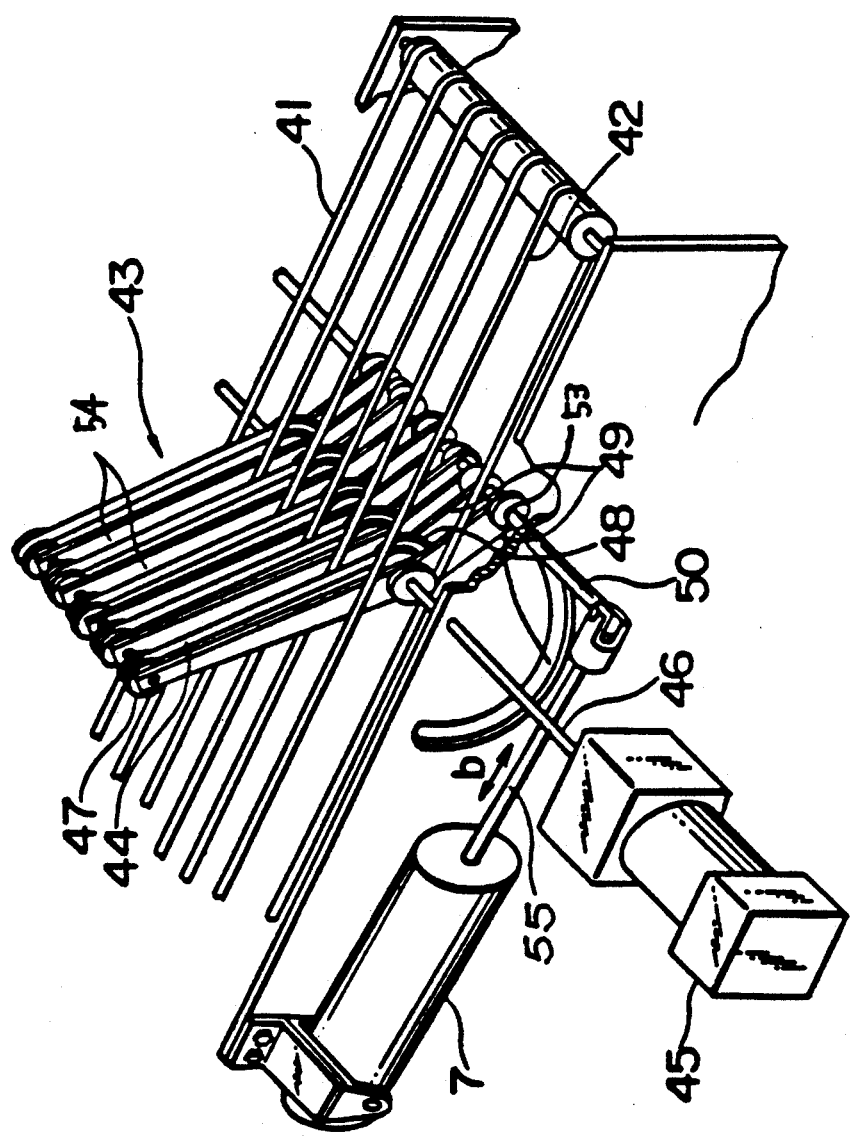
FIG. 2 is a partial perspective view of a part of this embodiment of the present invention.

The construction of the rolling-up preparation means 4 will now be explained. In FIG. 2, a plurality of conveyor belts 41 each made of string-like rubber and having a circular cross section, is provided along the direction of transfer, and the belts are parallel to each other. The belts are spaced apart from each other by a preset distance. They constitute a conveyor belt assembly. They are wound about a roll positioned at the upstream end and a roll positioned at the downstream end. One of the rolls is driven by a motor (not shown).

The distance between each adjacent pair of belts is not limited to a specific value, but in an embodiment the space between each adjacent belt 41 is 15 mm while the diameter of each of the belts 41 may be 4 mm, but it can be varied. As will be described below, these spaces are sufficient for the small endless belts 44 to move into and out of the spaces between the belts 41.

The small endless belts 44 will now be explained. These belts are rotatably fixed to a frame 43. They are string-like round in cross section, made of a relatively flexible substance like rubber, and are passed around drive pulleys 48 and idler pulleys 47. The frame 43 consists of a plurality of pairs of arms 54, each pair of arms holding a bracket 49 between them. The pulleys are rotatably mounted between the pairs of arms. The idler pulleys 47 are positioned at an end of the pairs of arms. This end constitutes a free end of the frame 43. The drive pulleys 48 are located at a position of the pairs of arms opposite to the free end of the frame 43, where each pair of the arms 54 is fixedly connected to an end of a bracket 49.

The belts 44 slightly project from the surface of the arms so that they can contact the base of the dough piece as it is conveyed toward them. The arms 54 are cantilevered from their drive pulley end and rotatably mounted on a drive shaft 46. Drive pulleys 48 are fixedly mounted on the drive shaft 46. The small endless belts 44 are parallel to each other with preset spaces between them such that they can pass through the conveyor belts 41 when pivoted about the drive shaft 46. A drive motor 45 is connected to the drive shaft 46 to rotate the latter.

The frame 43 is adapted to pivot around the drive shaft 46. The idler pulleys 47 mounted at the free end of the frame 43 move along an arcuate path by the pivoting action of the frame 43. The pivoting action of the frame 43 is caused by brackets 49 linked to a pneumatic cylinder 7 fixed to the frame of the present apparatus. The direction in which the frame 43 moves is shown by an arrow "a" in FIG. 1. Namely, a shaft 50 is rotatably connected to and extends through guide slot 53 of the brackets 49 at one end of the frame 43, and the shaft 50 is connected to a piston rod 55 of the pneumatic cylinder 7 such that the shaft 50 is rotatable about the drive shaft responsive to the movement of the piston rod 51. When the cylinder 7 is operated, the shaft 50 is made to move along a path defined by the guide slot 53. Thus the frame 43 is swung about the drive shaft as the piston rod 51 reciprocates, as shown by an arrow "b" in FIG. 2.

As shown in FIGS. 1 and 2, each of the plurality of the small endless belts 44 has the same space between each adjacent belt as do those of the conveyor belts 41, and the part of the plurality of the small endless belts 44 that is positioned at the free end part of the frame 43 is disposed to move into and out of the spaces between the belts 41 so that they move upwardly and downwardly of the conveying surface 420 of the conveyor beltts 41. The brackets 49 positioned between the driven pulleys 48 and the shaft 50 do not move above the conveying surface 420. As is apparent from FIG. 1, the rolling-up means 5 has a curling net 51 and a conveyor belt 52, between which a dough piece enters. Both the curling net 51 and the conveyor belt 57 are of any conventional type.

Figure 3:
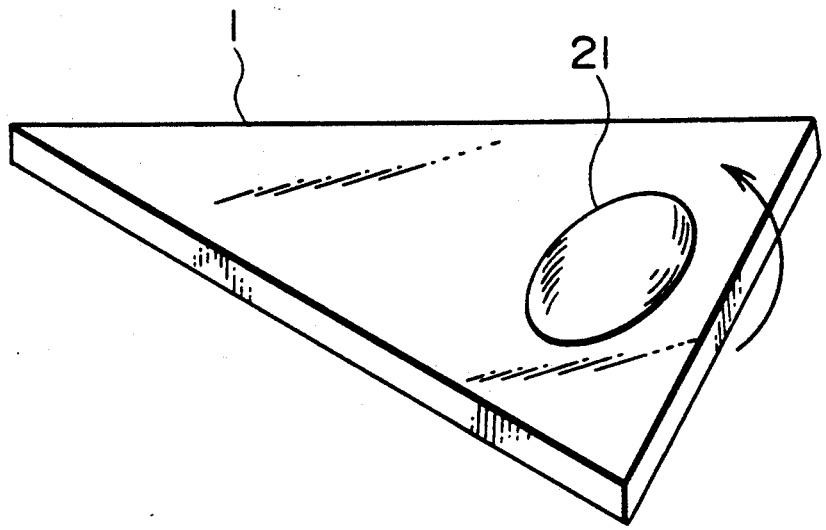
FIG. 3 shows a croissant dough piece with a filling on it.
Figure 4:
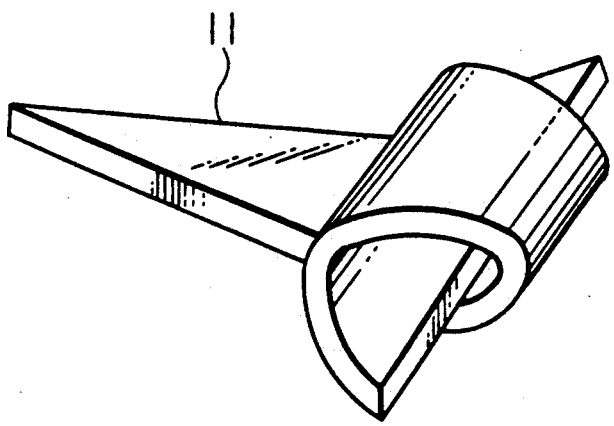
FIG. 4 shows a dough piece after the rolling-up preparation operation.

The action of the rolling-up preparation will now be explained. The dough piece 1, shown in FIG. 3, with the filling 21 deposited on it, is turned in by the rolling-up preparation means 4. The means 4 is shown in FIG. 1 in its stand-by condition, wherein the small belts 44 project diagonally from the conveying surface 420 in the upstream direction. The incoming dough piece 1 is raised at its leading edge by the forward movement of the belts 41 and 44 moving in the direction to raise the leading edge, and simultaneously turned backward to be folded in the upstream direction. Thus, as shown in FIG. 4, the filling is covered by the dough. Preforming the dough by the preparatory rolling-up step is thus completed by the above-mentioned action.

Thereafter, the free end part of the small endless belts 44 is swung in the downstream direction, by the operation of the pneumatic cylinder 7, to lower the small endless belts under the conveying surface 420. This permits the preformed dough piece 11 to be sent to the rolling-up means 5, where the pressing and rolling-up operations are performed simultaneously.

Figure 5:
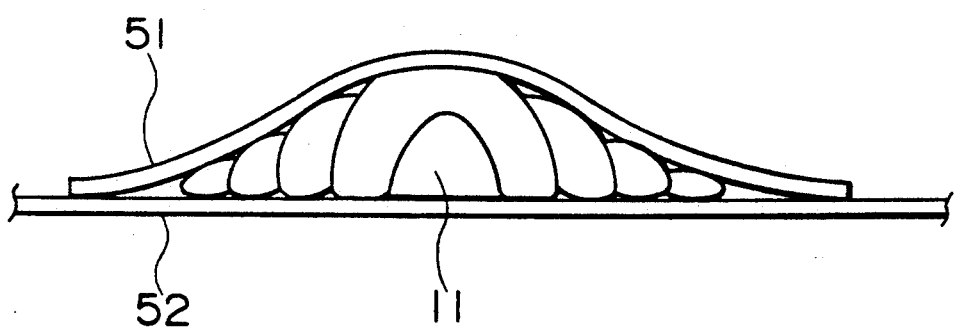
FIG. 5 shows a dough piece during the rolling and pressing operation.

Pressing is performed for the entire dough piece 11 by means of the net 51 pressing on the conveyor belt 52. As shown in FIG. 5, the net 51 is sufficiently flexible to follow the contour of the dough piece 11 as it is being rolled up. The clearance between the net 51 and the belt 52 is larger in the middle and smaller at the ends, to conform to the shape of a croissant.

Although not shown in the drawings, in another embodiment of the present invention, the small endless belt assembly can be positioned above the conveying surface of the conveyor belts of the rolling-up preparation means 4 in parallel with the conveyor belts. In this case a drive shaft similar to the drive shaft 46 swings the small belt assembly so that an end of the assembly intersects, from above, the conveying surface of the conveyor belts. Such an intersection is repeated at preset intervals.

A sequential operation may be performed through a programming means so that the lowering action of the frame 43 is performed after a preset time has passed after the turning-in operation is completed. The lowered free end part of the small belts is restored to their stand-by condition after a preset time has passed since they were lowered.

Although an embodiment has been described using jam as a filling, the filling is not limited to such a viscous substance. Any solid substance, such as Vienna sausages, chocolate bars, or the like, which is deposited beforehand on a dough piece, can also be enwrapped by the rolling-up preparation means of the present invention, thereby yielding good results and few failures. As opposed to conventional croissant producing apparatuses, in the present invention, the filling will not flow out of the dough piece onto the conveyor surface due to the provision of the rolling-up preparation means, which wraps fillings with dough prior to the dough piece being rolled up by the rolling-up means.

As stated above, the present invention can produce croissants with fillings by adding a rolling-up preparation step in the production line, and by so doing, even though a conventional rolling-up means is used, a continuous production is made possible, and a substantial improvement in production efficiency can be attained.

Although a preferred embodiment of the invention has been described in detail, it is to be understood that certain changes can be made by those skilled in the art without departing from the spirit and scope of the invention as defined by the appended claims.

We claim:

1. An apparatus for producing croissants with fillings, the apparatus comprising:

filling-depositing means for depositing a filling on a croissant dough piece which is being conveyed in a downstream direction;

rolling-up preparation means positioned downstream of the filling depositing means and including conveyor belt means including a plurality of conveyor belts spaced apart from and parallel to each other at first present distances to form a conveying surface, the rolling-up preparation means further including a plurality of cantilevered small endless belts spaced apart from and parallel to each other at second preset distances, a part of the small endless belts being movably adapted in the longitudinal direction to periodically intersect the plane of said conveyor belts at a preselected angle through spaces defined by the conveyor belts for raising the croissant dough piece at its leading edge and simultaneously turning the leading edge backward to be folded in an upstream direction to thereby cover the filling; and rolling-up means positioned downstream of the rolling-up means for rolling up the croissant dough piece.

2. The apparatus of claim 1 and wherein the rolling-up preparation means includes a drive shaft, a frame mounted to the drive shaft and containing a plurality of arms cantilevered from the drive shaft, and drive pulleys and idler pulleys mounted to first and second ends of the arms, respectively, and small endless belts being entrained around the drive pulleys and the idler pulleys, the drive pulleys being operatively connected to a drive means for driving the drive pulleys, the arms being operatively connected to a piston whereby the frame can be swung about the drive shaft to cause a free end of the frame to move into and out of the plane of the conveying surface.

3. The apparatus of claim 1 or 2 and wherein the conveyor belts and the small endless belts are made of string-like belts.

* * * * *